June 9, 1964 R. B. GELBARD 3,136,001
MOLD FOR MOLDING DYNAMICALLY BALANCED FANS
Filed May 31, 1963
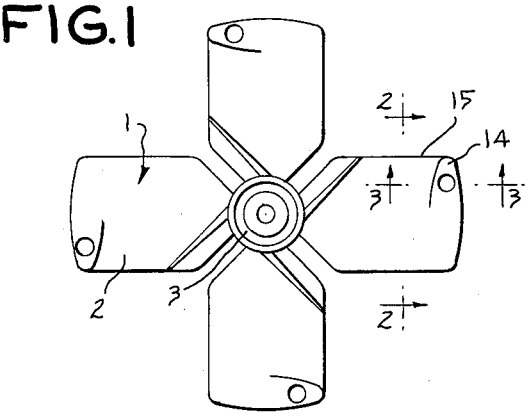
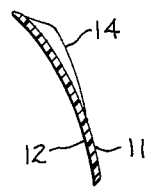
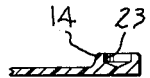
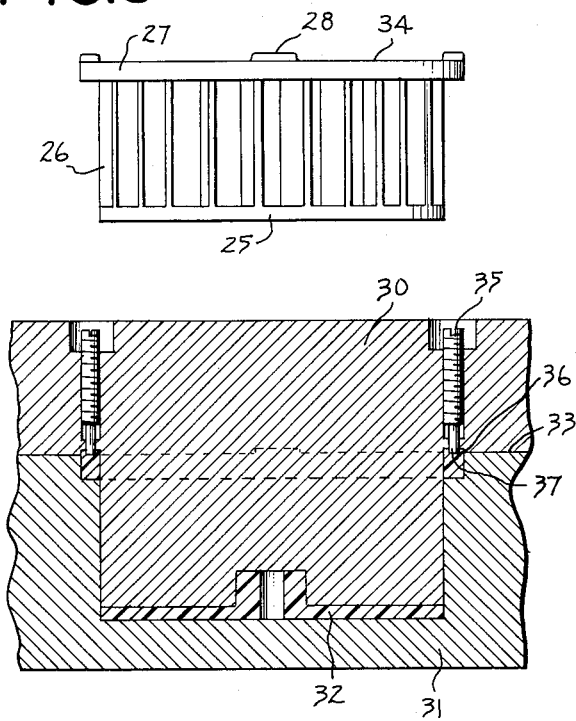
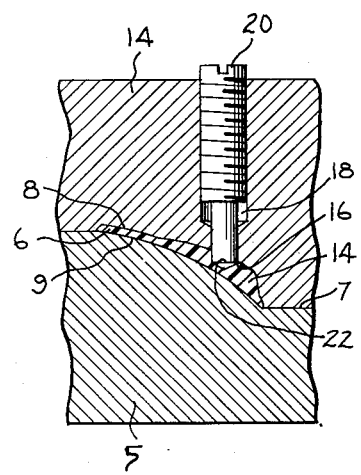
INVENTOR.
ROBERT B. GELBARD
BY
HIS ATTORNEY

United States Patent Office 3,136,001
Patented June 9, 1964

3,136,001
MOLD FOR MOLDING DYNAMICALLY
BALANCED FANS
Robert B. Gelbard, Louisville, Ky., assignor to General
Electric Company, a corporation of New York
Filed May 31, 1963, Ser. No. 284,539
4 Claims. (Cl. 18—42)

The present invention relates to the manufacture of dynamically balanced molded plastic fans and is particularly concerned with an improved mold including means for regulating the distribution of the plastic material within the mold to obtain a molded product of a precisely balanced weight distribution.

Due to the lower material and manufacturing costs and the ease with which they can be mass produced, one-piece molded plastic fans of both the impeller and centrifugal or blower types are being used as air circulating means in numerous appliances such as hair dryers, automobile heaters, refrigerators and the like. Even though such fans are relatively small and light, it is nevertheless desirable that they be dynamically balanced to within very accurate limits.

The usual method for obtaining dynamic balance has involved the molding of a test fan in each mold cavity, testing these molded fans for dynamic balance and thereafter machining away material from selected areas of the mold surfaces thereby to increase the weight of the portions of the fan formed by these areas to obtain a balanced weight distribution. This method has been expensive in requiring a considerable amount of hand polishing of the reworked mold cavity areas.

It is an object of the present invention to provide a mold for molding plastic fans including means for forming relatively thick balance pads on selected spaced aerodynamically inactive surface portions of the molded fan and adjustable means for accurately and quickly varying the amount of material included in these pads to provide the desired balance.

Another object of the invention is to provide a mold for molding a dynamically balanced plastic fan comprising a mold cavity and a plurality of spaced recesses in portions of the surfaces of the mold cavity defining aerodynamically inactive surface portions of the fan for forming balance pads on the molded fan structure of a thickness greater than the adjacent portions of the fan, and adjustable means extending into each of these recesses, for varying the weight of each of the pads.

Further objects and advantages of the invention will become apparent as the following description proceeds and the features of novelty which characterize the invention will be pointed out with particularity in the claims annexed to and forming part of this specification.

In carrying out the objects of the present invention, there is provided a mold comprising mold halves forming a mold cavity having the shape and configuration of the fan blades and supporting structure. The cavity includes a plurality of spaced recesses in portions of the mold surfaces defining peripheral inactive surface portions of the fan, which recesses form pads on such surface portions of the fan of a thickness greater than the adjacent portions of the fan. Each of the recesses includes a threaded hole therein extending perpendicular to the parting line formed by the two mold halves. Threaded members in each of these holes and having a non-threaded or smooth tip extending into a recess provide means for varying the size and hence the weight of each of the pads thereby providing means for increasing or decreasing the weight of one or more of the pads to dynamically balance the molded fan.

For a better understanding of the invention reference may be had to the accompanying drawing in which:

FIGURE 1 is an upstream elevational view of a molded plastic propeller fan manufactured by a mold incorporating the present invention;

FIGURE 2 is a sectional view of one of the blades of the fan of FIGURE 1 taken along line 2—2 of FIGURE 1;

FIGURE 3 is a sectional view of a portion of the same blade taken along line 3—3 of FIGURE 1;

FIGURE 4 is a sectional view of a portion of a mold employed in the manufacture of the fan of FIGURE 1 and embodying the present invention;

FIGURE 5 is a side view of a centrifugal or blower type fan made by means of a mold incorporating the present invention; and FIGURE 6 is a sectional view of a mold embodying the present invention for the manufacture of the centrifugal fan of FIGURE 5.

With reference to FIGURE 1 of the drawing, there is shown a propeller type fan of molded plastic material including both plastic blades 2 and a plastic hub 3. Such a fan is conveniently made by an injection molding technique employing cooperating mold halves generally defining the front and rear surfaces of the fan. The essential features of such a mold are shown in FIGURE 4 in which one mold half is indicated by the numeral 4 and the cooperating mold half by the numeral 5. As is well known, for the removal of the molded product from the mold cavity 6 defined by these mold halves, the two halves 4 and 5 are relatively movable in a direction generally perpendicular to a parting line 7.

In addition to surfaces 8 and 9 respectively provided on the upper and lower mold halves 4 and 5 for defining the rear and front surfaces 11 and 12 of the fan 1, or more specifically the surfaces of the fan above and below the parting line 7, the mold includes means for providing balancing pads at spaced peripheral portions of the fan and means for varying the amount of material in each of these balancing pads in order to provide a dynamically balanced molded fan. These pads are preferably provided on portions of the molded fan which may be described as being "inactive" or substantially inactive insofar as the airflow provided by the fan is concerned. In the propeller fan shown in FIGURE 1 of the drawing these pads, indicated by the numeral 14, are provided on the upstream trailing surfaces of the outer ends of each of the blades 2 adjacent the trailing edges 15 of these blades.

As is shown in FIGURE 4 of the drawing, each of these pads are formed by recesses 16 in the surfaces 8 of the mold defining the upstream surface of the fan blades 2. In order to provide means for varying the amount of material and hence the weight of the material in each of these pads, the mold half 4 is provided with holes 18 extending from each of the recesses 16 in a direction perpendicular to the parting line 7 of the mold. Threaded pins 20 are threadably supported in each of the holes 18 and each of these pins 20 have non-threaded tips 22 extending into the recesses 16. Rotation of the pins 20 provides means whereby a greater or lesser length of the tips 22 will extend into each of the recesses 16 so that the relative weight of each of the pads 14 can be varied as required to provide a dynamically balanced fan.

In the molding of a propeller type fan such as that shown in FIGURE 1 employing the mold of the present invention, a mold provided with surfaces forming a mold cavity defining the fan 1 including the pads 14 is employed to mold one or more test fans. Preferably each of the pins are so positioned so that the tips 22 thereof extend about half-way into each of the recesses 16 so that all of the pads 14 will have the same holes or depressions 23 therein for balanced appearance of the fan. The test fans are tested for dynamic balance and due to the practical difficulties in providing four mold portions of exactly the same size for forming the four blades of the fan, some unbalance will usually be noted. The degree of unbalance indicated by the test equipment is easily compensated for by suitable adjustment of the threaded pins 20. For example, if it is shown that opposite blades are unbalanced, additional weight is added to the lighter of the two blades by slightly withdrawing a pin 20 from the recess in that part of the mold cavity forming the lighter weight blade or alternatively the heavier blade may be decreased in weight by inserting the pin 20 farther into the proper recess 16. Where the unbalance is relatively large both adjustments can be made.

Since the pitch of the threads provided on the pin 20 is known as are also the dimensions of the tips 22, the amount of mold material added to or subtracted from the pads 14 by rotation of the pins 20 any given amount can be quickly determined so that the weights of the pads 14 can be quickly and accurately varied.

In the molding of centrifugal or blower type fans such as illustrated in FIGURE 5 of the drawing as comprising a hub plate 25, a plurality of peripheral blades 26 formed integrally with the plate 25 and a peripheral reinforcing ring 27 formed integrally with the opposite ends of the blades 26, the balanced pads 28 are preferably formed integral with the ring 27 or integral with the plate 25 or both, if the proportions of the blower justifies two plane balancing. In the illustrated embodiment the pads are formed on the ring 27. A molded centrifugal fan of this type is conveniently manufactured by means of the mold shown in FIGURE 6 which includes an upper mold half 30, a lower mold half 31 defining a mold cavity 32 including a parting line 33. This parting line is in the plane of the upper surface 34 of the reinforcing ring 27. The pads 28 preferably spaced at equal intervals about the periphery of the fan are formed by a plurality of recesses 36 in the upper mold half 30. The threaded pins 35 having the non-threaded end portions 37 extending into these recesses provide means for varying the amount of material contained in each of the pads 28 and hence the relative weight of these pads for balancing purposes, the regulation of these pins 35 to obtain a dynamically balanced molded product being the same as that employed in the molding of the propeller type fan of FIGURE 1.

While there has been shown and described specific embodiments of the present invention, it will be understood that the invention is not limited thereto and it is intended by the appended claims to cover all such modifications as come within the true spirit and scope of the invention.

What I claim as new and desire to secure by Letters Patent of the United States is:

1. A mold for molding a dynamically balanced plastic fan comprising mold halves including cavity surfaces forming a mold cavity having the shape and configuration of said fan, a plurality of spaced recesses in portions of said cavity surfaces defining peripheral inactive surface portions of said fan for forming pads on said surface portions of said fan, a threaded hole extending from each of said recesses perpendicular to the parting line of said mold halves, and a pin threaded into each of said holes and having a non-threaded tip adapted to extend into said recess whereby adjustment of said pin provides means for varying the weight of one or more of said pads to provide a dynamic balance in said fan.

2. A mold for molding a dynamically balanced plastic fan comprising mold halves forming a mold cavity having the shape and configuration of said fan, a plurality of spaced recesses in portions of a wall of said cavity defining peripheral inactive surface portions of said fan for forming pads on said surface portions of said fan of a thickness greater than the adjacent portions of said fan, a hole extending from each of said recesses perpendicular to the parting line of said mold halves, and a pin threadably secured in each of said holes and having a non-threaded head extending into said recess, adjustment of one or more of said pins providing means for varying the relative weights of said pads to provide a dynamic balance in said fan.

3. A mold for molding a dynamically balanced propeller type plastic fan comprising mold halves forming a mold cavity having the shape and configuration of said fan, a plurality of spaced recesses in portions of a wall of said cavity forming trailing edge of the rear sides of the fan blades, for forming pads on said rear sides of a thickness greater than the adjacent portions of said fan, a hole extending from each of said recesses perpendicular to the parting line of said mold halves, and a pin threadably secured in each of said holes and having a non-threaded head adapted to extend into said recess, adjustment of each of said pins providing means for varying the weight of each of said blades to provide a dynamic balance in said fan.

4. A mold for molding a dynamically balanced centrifugal fan including a peripheral portion supporting the blades of said fan, said mold comprising mold halves forming a mold cavity having the shape and configuration of said fan, a plurality of spaced recesses in portions of a wall of said cavity defining said peripheral portion for forming spaced pads on said portion of said fan of a thickness greater than the adjacent areas of said portion, a hole extending from each of said recesses perpendicular to the parting line of said mold halves, and a pin threadably secured in each of said holes and having a non-threaded head adapted to extend into said recess, adjustment of each of said pins providing means for varying the weight of each of said pads to provide a dynamic balance in said fan.

References Cited in the file of this patent

UNITED STATES PATENTS

| | | |
|---|---|---|
| 446,178 | Barlow | Feb. 10, 1891 |
| 2,881,486 | Soref | Apr. 14, 1959 |